US011913775B2

United States Patent
Hatano et al.

(10) Patent No.: US 11,913,775 B2
(45) Date of Patent: Feb. 27, 2024

(54) INTRA-HOISTWAY MEASUREMENT SYSTEM

(71) Applicant: Hitachi Building Systems Co., Ltd., Tokyo (JP)

(72) Inventors: Toshiaki Hatano, Tokyo (JP); Daisuke Matsuka, Tokyo (JP); Makoto Hattori, Tokyo (JP); Yuta Hamada, Tokyo (JP); Hirofumi Taguchi, Tokyo (JP); Masato Itou, Tokyo (JP)

(73) Assignee: HITACHI BUILDING SYSTEMS CO., LTD., Tokyo (JP)

( * ) Notice: Subject to any disclaimer, the term of this patent is extended or adjusted under 35 U.S.C. 154(b) by 297 days.

(21) Appl. No.: 17/270,465

(22) PCT Filed: Oct. 7, 2019

(86) PCT No.: PCT/JP2019/039485
§ 371 (c)(1),
(2) Date: Feb. 23, 2021

(87) PCT Pub. No.: WO2020/075671
PCT Pub. Date: Apr. 16, 2020

(65) Prior Publication Data
US 2021/0325173 A1 Oct. 21, 2021

(30) Foreign Application Priority Data
Oct. 9, 2018 (JP) ................ 2018-190691

(51) Int. Cl.
*G01B 11/24* (2006.01)
*B66B 5/00* (2006.01)

(52) U.S. Cl.
CPC ............ *G01B 11/24* (2013.01); *B66B 5/0087* (2013.01)

(58) Field of Classification Search
CPC ..... B66B 19/00; B66B 5/0087; G01B 11/026; G01B 11/24
See application file for complete search history.

(56) References Cited

U.S. PATENT DOCUMENTS

| | | | |
|---|---|---|---|
| 2010/0309452 A1 | 12/2010 | Qiu et al. | |
| 2011/0096957 A1 | 4/2011 | Anai et al. | |
| 2015/0158699 A1* | 6/2015 | Haapaniemi | B66B 5/0087 702/155 |

FOREIGN PATENT DOCUMENTS

| | | |
|---|---|---|
| CN | 108008401 A | 5/2018 |
| EP | 3 156 359 A1 | 4/2017 |

(Continued)

OTHER PUBLICATIONS

1 Indian Office Action received in corresponding Indian Application No. 202117007801 dated Aug. 18, 2021.

(Continued)

*Primary Examiner* — Tri T Ton
(74) *Attorney, Agent, or Firm* — Mattingly & Malur, PC (57) ABSTRACT

The present invention provides an intra-hoistway measurement system automatically measuring dimensions within an elevator hoistway prior to elevator installation to reduce labor of workers. An intra-hoistway measurement system according to the present invention includes: a reference laser device that is mounted to a structure on a ceiling or in an upper portion of the hoistway for an elevator and emits a laser beam toward a lowermost part; a mobile measuring device that has a plane measuring device to measure horizontal dimensions within the hoistway; and a moving device that is mounted to the structure on the ceiling or in the upper portion of the hoistway and moves the mobile measuring device up and down. The mobile measuring device has a reference laser detection device that detects the laser beam (Continued)

emitted from the reference laser device, and an attitude detection device that detects its own attitude.

7 Claims, 7 Drawing Sheets

(56) References Cited

FOREIGN PATENT DOCUMENTS

| JP | 2007-261794 A | 10/2007 |
|----|---------------|---------|
| JP | 2010-014443 A | 1/2010 |
| JP | 2011-506222 U | 3/2011 |
| JP | 4666842 B2 | 4/2011 |
| JP | 2017-227463 A | 12/2017 |
| JP | 2018-54346 A | 4/2018 |

OTHER PUBLICATIONS

Extended European Search Report received in corresponding European Application No. 19870379.5 dated Jun. 2, 2022.
International Search Report of PCT/JP2019/039485 dated Dec. 3, 2019.
1 Chinese Office Action dated Dec. 28, 2021, issued in corresponding CN Application No. 201980055161.1.

* cited by examiner

INTRA-HOISTWAY MEASUREMENT SYSTEM

TECHNICAL FIELD

The present invention relates to an intra-hoistway measurement system measuring dimensions within an elevator hoistway.

BACKGROUND ART

In developed countries including Japan, North America and Europe, a decrease in expert workers for elevator installation work with lower birthrate and more aging population becomes an issue, and there is a need to worker savings and labor savings in the elevator installation work. Currently, the elevator installation work is generally performed manually, and therefore the amount of time required for the installation work varies greatly depending on skill level of the workers. Technical know-how and skills of workers are required to measure dimensions within an elevator hoistway and derive reference coordinates for installation.

Japanese Patent Application Laid-Open No. 2007-261794 (PTL 1) is known as the background art in such technical filed. The publication describes an elevator dimension measuring device including: an axial position measurement unit that is placed in a first reference point on a car, and determines a position of the first reference point on the hoistway axis by throwing a laser beam in an axial direction of the hoistway and receiving the laser beam reflected from the ceiling of the hoistway; a depthwise dimension measurement unit and a widthwise dimension measurement unit that are placed in a second reference point on the car, and measure dimensions from the second reference point to inner walls by throwing a laser beam in directions orthogonal to the axis and receiving the laser beam referenced from the inner walls of the hoistway; a plumb spot laser beam device that is placed in the hoistway and throws a laser beam in the vertical direction; a position detector that is placed on the car and measures a plumb point position at which the laser beam is received; and a personal computer that calculates a distance between the plumb point and the second reference point (see Abstract).

CITATION LIST

Patent Literature

PTL 1: Japanese Patent Application Laid-Open No. 2007-261794

SUMMARY OF INVENTION

Technical Problem

In PTL 1, the elevator dimension measuring device is described which measuring a dimension of the car deviated in a direction orthogonal to the axis. However, the elevator dimension measuring device described in PTL 1 is for measuring a dimension of the car deviated in a direction orthogonal to the axis, and is intended to be used to perform maintenance check or renewal on the elevator. And, the measuring device is mounted on the existing elevator car, and therefore the measuring device, together with the car, is moved up and down along the car rail to measure the dimensions within the elevator hoistway.

Given these circumstances, the present invention provides an intra-hoistway measurement system automatically measuring dimensions within an elevator hoistway prior to elevator installation to reduce labor of workers.

Solution to Problem

To solve the problem, an intra-hoistway measurement system according to the present invention includes: a reference laser device that is mounted to a structure on a ceiling or in an upper portion of a hoistway for an elevator and emits a laser beam toward a lowermost part; a mobile measuring device that has a plane measuring device to measure dimensions in a horizontal direction within the hoistway; and a moving device that is mounted to the structure on the ceiling or in the upper portion of the hoistway and moves the mobile measuring device up and down. The mobile measuring device has: a reference laser detection device that detects the laser beam emitted from the reference laser device; and an attitude detection device that detects its own attitude.

Advantageous Effects of Invention

According to the present invention, an intra-hoistway measurement system is provided which is capable of automatically measuring dimensions within an elevator hoistway prior to elevator installation to reduce labor of workers.

The above and other problems, configurations and advantages will be apparent from example embodiments described below.

DESCRIPTION OF EMBODIMENTS

Embodiments according to the present invention will now be described with reference to the accompanying drawings. It is noted that like reference signs indicate similar or identical elements and a description may not be given of such elements for the purpose of avoiding duplicate description.

Example 1

Figure 1:
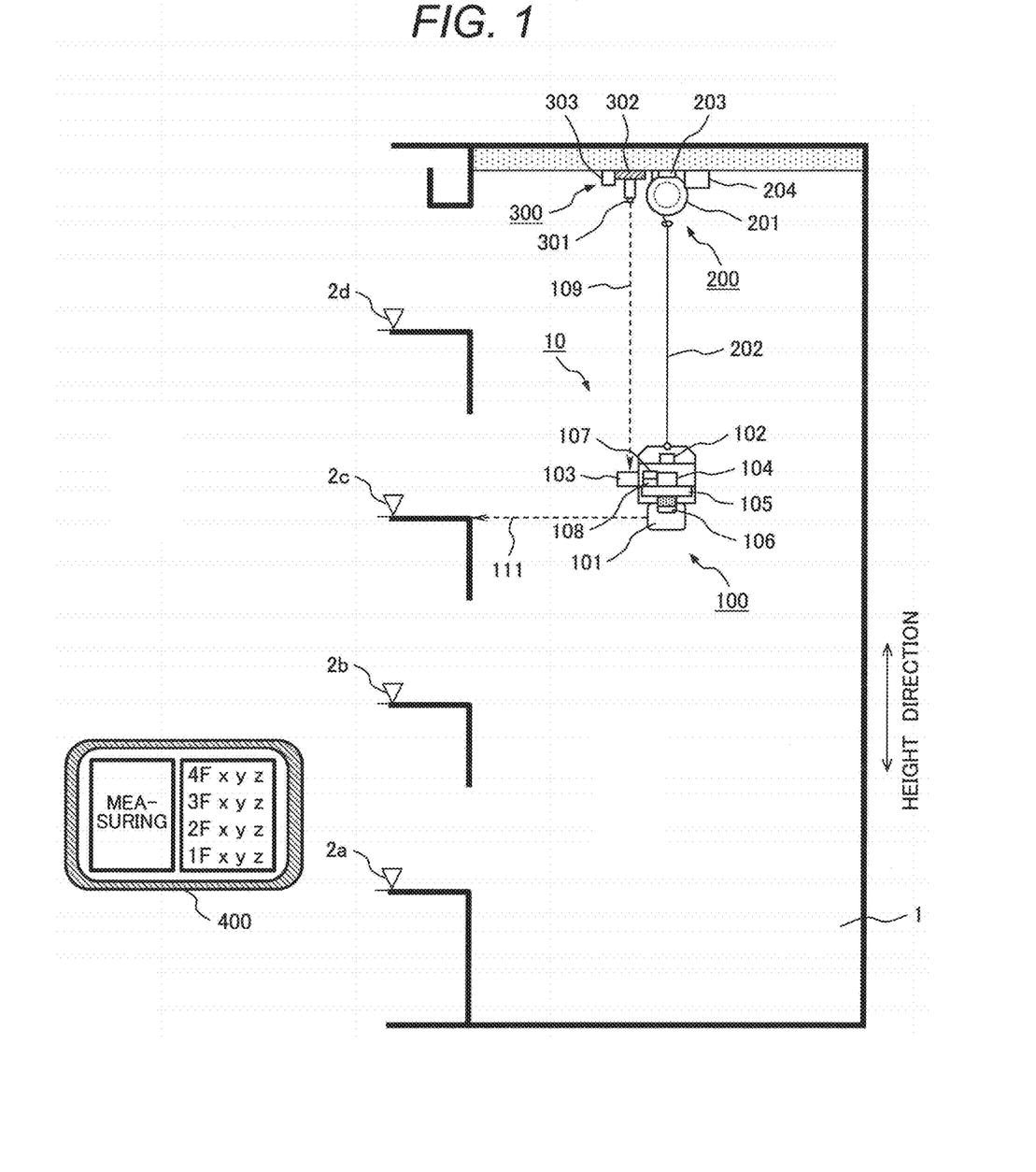
FIG. 1 is an explanatory schematic diagram illustrating an intra-hoistway measurement system according to the example.

FIG. 1 is an explanatory schematic diagram illustrating an intra-hoistway measurement system according to the example, which shows a side view of an elevator hoistway 1 in a four-story building (first floor 2a, second floor 2b, third floor 2c, fourth floor 2d).

Reference is made to FIG. 1 to describe an intra-hoistway measurement system 10 referred to in the example.

The intra-hoistway measurement system 10 used to measure dimensions within the elevator hoistway 1 is mainly composed of three devices, i.e., a mobile measuring device 100, a moving device (explained hereinafter as a "hoisting device") 200, and a reference laser device 300.

The hoisting device 200 moving up/down the mobile measuring device 100, and the reference laser device 300 emitting a laser beam 109 vertically from the top of the hoistway 1 toward the lowermost part are mounted to a structure on the ceiling or in an upper portion of the hoistway 1.

The mobile measuring device 100 is engaged and suspended by a rope 202 of the hoisting device 200. A hoist 201 of the hoisting device 200 rolls up or unroll the rope 202 so that the mobile measuring device 100 moves up/down in the vertical direction within the hoistway 1 in order to automatically measure dimensions within the hoistway 1.

Specifically, the hoisting device 200 has: the hoist 201 that is mounted to a structure on the ceiling or in an upper portion of the hoistway 1; and the rope 202 that is connected to the hoist 201 to suspend the mobile measuring device 100.

Noted that the hoisting device 200 has: a hoisting device power source 204 that drives the hoist 201; and a communication device 203 in wireless communication with the mobile measuring device 100.

And, the mobile measuring device 100 has: a plane measuring device 101 that includes a laser scanning distance sensor and/or the like to measure dimensions within the hoistway 1 in the horizontal direction; an attitude detection device 102 that includes an IMU (Inertial Measurement Unit) and/or the like to detect its own attitude; and a reference laser detection device 103 that includes a positional photosensor and/or the like to detect a laser beam 109 emitted from the reference laser device 300. It is noted that additional examples of the attitude measuring device 102 include a gyrosensor, a magnetic sensor, a compass, and the like.

The mobile measuring device 100 further has: an arithmetic device 104 that computes dimensions within the hoistway 1, the amount of up/down movement of the mobile measuring device 100, and the like based on measurement data obtained from the plane measuring device 101, the attitude detection device 102, and the reference laser detection device 103; a camera 106 that images its own surroundings; a first communication device 107 in wireless communication with the hoisting device 200; a second communication device 108 in wireless communication with a portable control terminal 400 of a worker; and a mobile measuring device power source 105 that drives various devices (the plane measuring device 101, the attitude detection device 102, the reference laser detection device 103, the arithmetic device 104, the camera 106, the first communication device 107, and the second communication device 108) incorporated into the mobile measuring device 100.

It is noted that the arithmetic device 104 computes dimensions within the hoistway 1 based on the measurement data obtained from the plane measuring device 101, the reference laser detection device 103, and the attitude detection device 102.

It is noted that the reference laser device 300 has: a reference laser irradiator 301 that emits the laser beam 109; a reference laser mount 302 on which the reference laser irradiator 301 is mounted; and a reference laser device power source 303 that drives the reference laser irradiator 301.

In the example, when the mobile measuring device 100 is moved, for example, from above (below) to below (above) within the hoistway 1 to measure dimensions within the hoistway 1, the reference laser detection device 103 of the mobile measuring device 100 detects first the laser beam 109 emitted from the reference laser device 300. Thereby, three-dimensional coordinates within the hoistway 1 for the mobile measuring device 100 can be identified.

That is, when the laser beam 109 emitted vertically from the top in the hoistway 1 toward the lowermost part is used as a measurement reference, and, for example, a direction of a plane having an X axis direction and a Y axis direction is defined as a horizontal direction, and a z axis direction is defined as a vertical direction, a position of the mobile measuring device 100 in the horizontal direction in the hoistway 1 and a position of the mobile measuring device 100 in the vertical direction can be identified. It will be understood that a position in the vertical direction may be identified by use of the hoisting device 200.

Also, the attitude detection device 102 of the mobile measuring device 100 detects its own attitude (inclination) from acceleration and angles in three directions (angular velocity), i.e., the X axis direction, the Y axis direction and the Z axis direction. This makes it possible to detect how much the mobile measuring device 100 is inclined from the horizontal direction. Thus, an inclination of the mobile measuring device 100 from the horizontal direction can be identified.

A measurement reference for measuring dimensions within the elevator hoistway 1 is important in the elevator hoistway 1 prior to the elevator installation. And, when the dimensions within the hoistway 1 in the horizontal direction is measured based on the measurement reference, an attitude (inclination) of the mobile measuring device 100 is particularly important. Stated another way, identifying the attitude (inclination) of the mobile measuring device 100 enables accurate measurement of the dimensions within the hoistway 1 in the horizontal direction.

In this manner, three-dimensional coordinates (position) and three-dimensional attitude (inclination) of the mobile measuring device 100 can be detected by the reference laser detection device 103 and the attitude detection device 102. This makes it possible to measure the dimensions within the hoistway 1 prior to the elevator installation with accuracy.

Also, the mobile measuring device 100 is capable of automatically recognizing timing for measuring dimensions within the hoistway 1 through the camera 106. That is, parts corresponding to the respective floors, and parts where doors and a car door are formed (empty space and openings (around entrances) before the elevator is installed), exist in the hoistway 1 prior to the elevator installation. To address this, the camera 106 can be used to recognize each floor part for the automatic starting of a measurement. Thus, an efficient measurement is enabled.

The mobile measuring device 100 is also capable of automatically recognizing timing for measuring dimensions within the hoistway 1, by use of a laser beam 111 emitted from the plane measuring device 101 of the mobile measuring device 100. That is, each floor part and each part where a door and a car door are formed (empty space and an opening (around an entrance) before the elevator is installed), exist in the hoistway 1 prior to the elevator installation. Therefore, the laser beam 111 emitted from the plane measuring device 101 can be used to recognize a floor part (the laser beam 111 emitted from the plane measuring device 101 is reflected off the floor part), to start a measurement in an automatic manner. Thus, an efficient measurement is enabled.

In the example, prior to installing the elevator in the hoistway 1, dimensions within the hoistway 1 are measured. This is because the hoistway 1 is not necessarily constructed according to information on design drawings and construction errors exist. For example, it is conceivable that the center axis of the hoistway 1 may deviate from a center axis in the design drawing information or may be inclined, or that an entrance of a certain floor may be more projected or more recessed than necessary. According to the example, in the hoistway 1 as such, reference coordinates (absolute coordinates) are also set for properly installing an elevator, and also the attitude (inclination) of the mobile measuring device 100 is identified to measure dimensions within the hoistway 1 with accuracy. Thereby, when an elevator is actually installed, the installation may be enabled without interference of the elevator with the hoistway 1 and with a proper gap between the elevator and an entrance on each floor.

Figure 2:
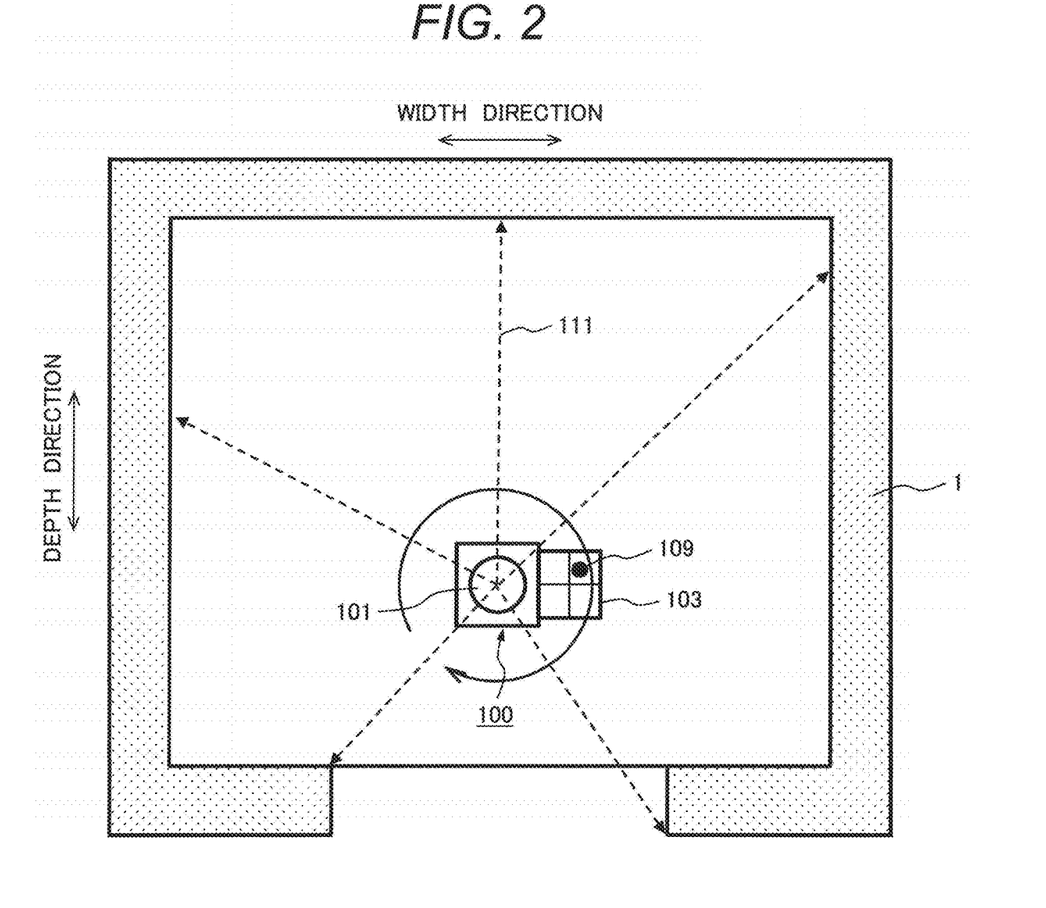
FIG. 2 is an explanatory schematic diagram of a hoistway according to the example when looked down from above.

FIG. 2 is an explanatory schematic diagram of the hoistway according to the example when looked down from above.

The arrow with a broken line shown in FIG. 2 represents a trajectory of the laser beam 111 emitted by the plane measuring device 101 of the mobile measuring device 100.

By the reference laser detection device 103 which detects a position of the laser beam 109 emitted from the reference laser device 300, three-dimensional coordinates within the hoistway 1 of the mobile measuring device 100 can be identified. Specifically, coordinates in the height direction (Z axis direction), the depth direction (Y axis direction), and the width direction (X axis direction) of the mobile measuring device 100 can be identified.

Also, the attitude detection device 102 is capable of calculating what attitude (how much inclination) the mobile measuring device 100 is in at the time when the plane measuring device 101 makes a measurement to obtain the measurement data. Thus, the measurement data on measurements of the plane measuring device 101 can be corrected from an inclination of the mobile measuring device 100 (measurement data) which is detected by the attitude detection device 102, so that an accurate distance in the horizontal direction can be identified.

It is noted that, if the distance between the reference laser device 300 and the mobile measuring device 100 is long, the laser beam 109 will more spread out as the distance is longer. In such a case, the spreading laser beam 109 may be caused to converge by installing a beam compressor and/or the like in an upper portion of the reference laser detection device 103.

Also, the plane measuring device 101 rotates to measure dimensions (distances) within the hoistway 1 in the horizontal direction. And, the plane measuring device 101 has: distance measuring means (not shown) for emitting the laser beam 111 to measure a distance in the hoistway 1 in the horizontal direction: and rotating means (not shown) for scanning the optical axis of the laser beam 111 of the distance measuring means in the horizontal direction.

According to the example, the laser beam 109 is emitted vertically from the top of the hoistway 1 toward the lowermost part to act as a measurement reference. Using, as the measurement reference, the laser beam 109 emitted vertically from the top of the hoistway 1 toward the lowermost part, enables comparisons among dimensions measured within the hoistway 1 in the planar direction at each floor in order to identify reference coordinates to be used for elevator installation. Thereby, dimensions within the hoistway 1 can be compared among floors, and therefore an elevator can be installed without interference of the elevator with the hoistway 1 and with a proper gap between the elevator and an entrance on each floor.

Also, the mobile measuring device 100 is simply installed (only in the upper portion of the hoistway 1), and the need for a worker to carry out measurement at each floor is obviated. This enables a reduction in time and manpower required enormously by the worker moving up and down.

In this manner, in the example, the mobile measuring device 100, which moves up and down within the hoistway 1 to measure dimensions within the hoistway 1 in an automatic manner, detects automatically reference coordinates and dimensions within the hoistway 1.

Figure 3:
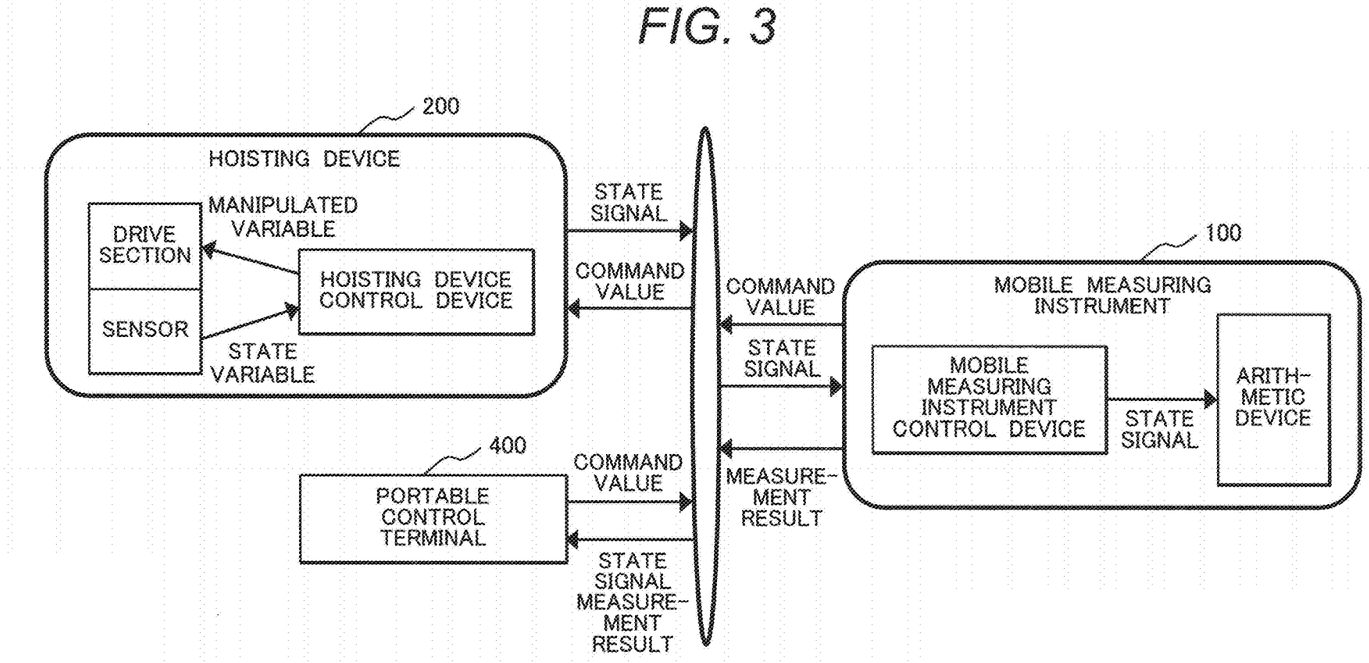
FIG. 3 is an explanatory schematic diagram illustrating a control system according to the example.

FIG. 3 is an explanatory schematic diagram illustrating a control system according to the example.

A control system of the intra-hoistway measurement system 10 will now be described. Provided herein is an instance where the mobile measuring device 100 and the hoisting device 200 perform automatic measurement in conjunction with each other.

First, the portable control terminal 400 transmits a command value to the hoisting device 200. Here, the command value transmitted to the hoisting device 200 by the portable control terminal 400 includes height information of each floor and/or the like, for example, in an instance of measuring dimensions within the hoistway 1 in a four-story building (first floor 2a, second floor 2b, third floor 2c, and fourth floor 2d) as shown in FIG. 1.

In the hoisting device 200, a hoisting device control device receives the transmitted command value, and then transmits the received command value as a manipulated variable to a drive section (hoist 201) to cause the drive section to drive in response to the manipulated variable. For example, the drive section unrolls the rope 202 to move the mobile measuring device 100 to the floor of the fourth floor 2d. Then, a sensor detects the drive amount of the drive section as a state variable (e.g., floor height information of the fourth floor 2d), and transmits the state variable to the hoisting device control device. It is noted that, although not shown in FIG. 1, the hoisting device control device and the sensor are placed in the hoisting device 200.

The hoisting device 200 transmits the state variable as a state signal to the mobile measuring device 100 and the portable control terminal 400.

In the mobile measuring device 100, a mobile measuring device control device receives the transmitted state signal (e.g., floor height information of the fourth floor 2d), and then transmits the state signal to an arithmetic section (arithmetic device 104). In the mobile measuring device 100, based on the reception of the state signal, the plane measuring device 101 and the attitude detection device 102 are driven to measure dimensions within the hoistway 1. A measurement result of the measurement (measurement data) is input and saved to the arithmetic section and also is transmitted to the portable control terminal 400. It is noted that, although not shown in FIG. 1, the mobile measuring device control device is placed in the mobile measuring device 100.

After that, the mobile measuring device 100 transmits a command value to the hoisting device 200 for indicating that the measurement of the dimensions within the hoistway 1 for one floor has been completed.

Then, in the hoisting device 200, the hoisting device control device receives the transmitted command value, and then transmits the received command value as a manipulated variable to the drive section to cause the drive section to drive in response to the manipulated variable. For example, the drive section unrolls the rope 202 and drives the mobile measuring device 100 to a floor of the third floor 2c. Then, the sensor detects the drive amount of the drive section as a state variable (e.g., floor height information of the third floor 2c), and transmits the state variable to the hoisting device control device.

Then, in the mobile measuring device 100, the mobile measuring device control device receives the transmitted state signal (e.g., floor height information of the third floor 2c), and then transmits the state signal to the arithmetic section. In the mobile measuring device 100, based on the reception of the state signal, the plane measuring device 101 and the attitude detection device 102 are driven to measure dimensions within the hoistway 1. A measurement result of the measurement is input and saved to the arithmetic section and also is transmitted to the portable control terminal 400.

The mobile measuring device 100 may also transmit, for example, height information detected by the reference laser detection device 103 of the mobile measuring device 100, to the hoist 201 (drive section) of the hoisting device 200 in order to provide an instruction on the height information pertaining to a destination (manipulated variable), and thus the mobile measuring device 100 may be moved up/down.

In this manner, the mobile measuring device 100 and the hoisting device 200 form a control system to perform automatic measurement between the mobile measuring device 100 and the hoisting device 200 in such a manner that the mobile measuring device 100 receives a state signal from the hoisting device 200 and the mobile measuring device 100 transmits a command value to the hoisting device 200.

It is noted that the portable control terminal 400 carried by the worker transmits a movement instruction (command value) to the hoisting device 200 and a measurement instruction to the mobile measuring device 100, and the portable control terminal 400 receives and display the measurement result.

Figure 4:
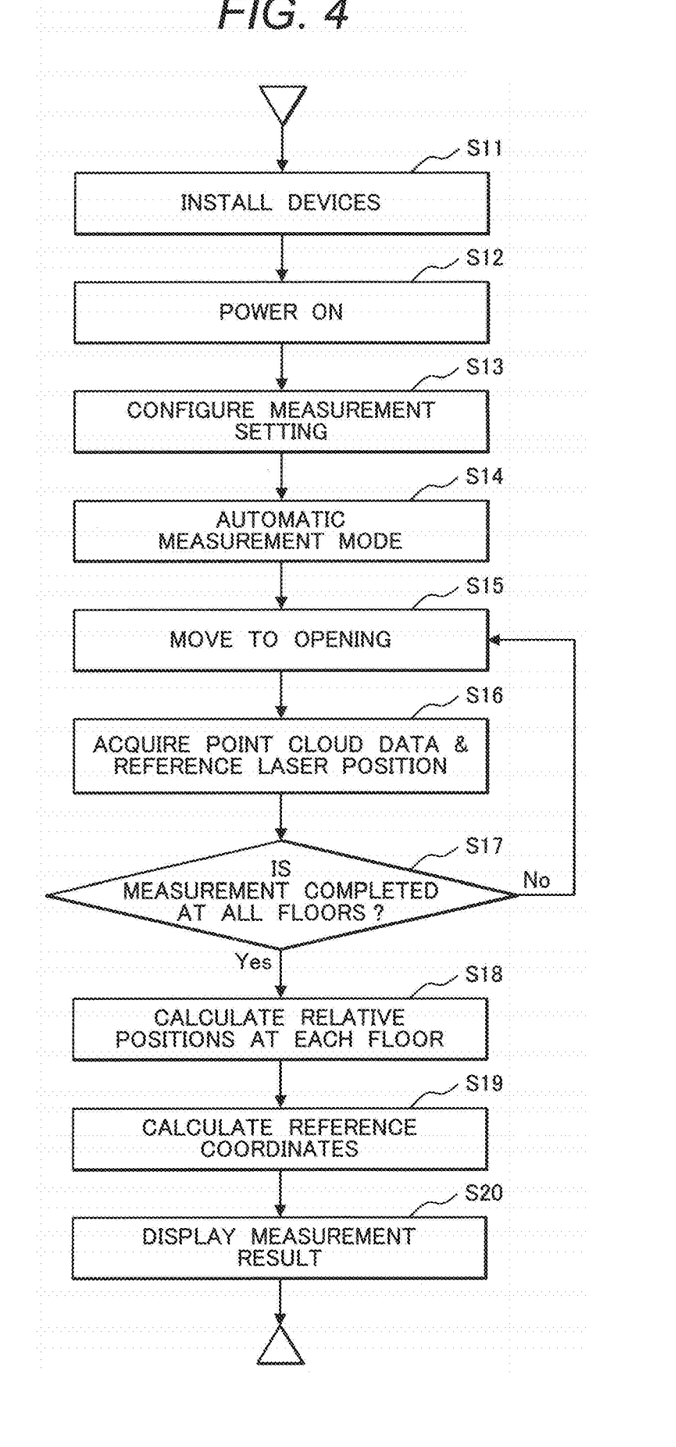
FIG. 4 is an explanatory schematic diagram illustrating a working flow according to the example.

FIG. 4 is an explanatory schematic diagram illustrating a working flow according to the example.

Initially, preparatory to measurement, the hoisting device 200 and the reference laser device 300 are mounted to the structure on the ceiling or in an upper portion of the hoistway 1 (device installation). In this process, the mobile measuring device 100 is engaged with one end of the rope 202 to be suspended (S11).

Subsequently, the hoisting device 200, the reference laser device 300, the mobile measuring device 100, and the portable control terminal 400 are powered on and the communications between them is checked (S12).

Subsequently, the worker configures a measurement setting (transmits a command value) through the portable control terminal 400 on hand (S13).

Then, a transition to automatic measurement mode is caused (S14).

After that, for example, based on images taken by the camera 106 incorporated in the mobile measuring device 100 and on known design drawing information for the hoistway 1, the rope 202 is extended to move the mobile measuring device 100 to an opening (around an entrance) on the top floor (e.g., the fourth floor 2d) in the hoistway 1 (S15).

Upon the mobile measuring device 100 reaching a height to be measured, the mobile measuring device 100 is stopped and the reference laser detection device 103 and the plane measuring device 101 are actuated to acquire horizontal (planar) point cloud data (measurement data) and simultaneously to acquire a position (measurement reference) of the laser beam 109 detected by the reference laser detection device 103 (S16).

The above work operation (operation in S15 and S16) is repeated at each floor opening (around each entrance) (S17). As a result, measurements are obtained of dimensions (distance: measurement data) of dimensions within the hoistway 1 in the horizontal (planar) direction from the measurement reference in each floor (a distance from the measurement reference to each wall, a distance to the opening (around the entrance), and the like).

After a series of work operations has been completed, the horizontal (planar) point cloud data acquired at each floor and a position of the laser beam 109 are compared with each other to calculate relative positions in horizontal (planar) point cloud data at each floor (S18). It is noted that the inclination (measurement data) of the mobile measuring device 100 (in particular, the plane measuring device 101) measured by the attitude detection device 102 is used to correct the measurement data measured by the plane measuring device 101.

Then, optimum reference coordinates are calculated from the relative positions in the horizontal (planar) point cloud data for elevator installation (S19).

Lastly, the measurement result is displayed on the portable control terminal 400 carrying he worker (S20).

In this manner, according to the example, the laser beam 109 emitted vertically from the top of the hoistway 1 toward the lowermost part is detected by the reference laser detection device 103 incorporated in the mobile measuring device 100, thereby identifying the measurement reference within the hoistway 1 for the mobile measuring device 100 moving up and down in the hoistway 1. Also, the attitude detection device 102 incorporated in the mobile measuring device 100 detects its own attitude (inclination). This enables accurate measurement of dimensions within the hoistway 1 prior to elevator installation, leading to identifying optimum reference coordinates with accuracy for elevator installation.

As a result, the relative relationship of the horizontal measurement data of the hoistway 1 resulting from the measurement at each floor can be computed. Also, the mobile measuring device 100 is simply mounted, and the need for the worker to carry out measurement at each floor is obviated. This enables a reduction in time and manpower required enormously by the worker moving up and down.

Example 2

Figure 5:
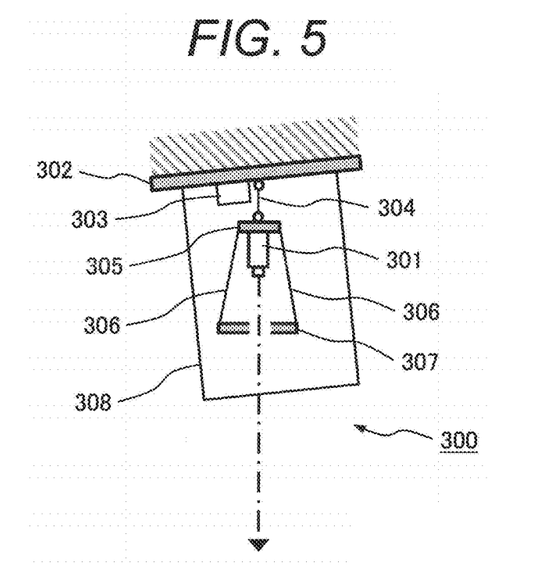
FIG. 5 is an explanatory schematic diagram illustrating a reference laser device according to Example 2.

FIG. 5 is an explanatory schematic diagram illustrating a reference laser device according to Example 2.

The reference laser device 300 is mounted to the structure on the ceiling or in an upper portion of the hoistway 1. However, the reference laser mount 302 may not always be mounted in a horizontal position. In this event, some way to emit the laser beam 109 in the vertical direction is required.

To address this, as illustrated in FIG. 5, the reference laser device 300 has the reference laser irradiator 301 suspended by a rope 304. And, the reference laser irradiator 301 is mounted on a reference laser holder 305, and a weight 307 is suspended from the reference laser holder 305 by a plurality of ropes 306. By using the rope 304 to suspend the reference laser irradiator 301, the reference laser irradiator 301 is always oriented in the gravity direction (vertical direction).

Specifically, the reference laser device 300 described in the example has: the reference laser holder 305 that is suspended from the structure on the ceiling or in an upper portion of the hoistway 1 by the rope 304; the reference laser irradiator 301 that is mounted to the reference laser holder 305; and the weight 307 that is suspended from the reference laser holder 305 by the plurality of ropes 306 and has an opening formed at the center thereof.

For inhibiting swinging of the reference laser irradiator 301 suspended in this manner, the weight 307 with sufficiently heavier than the weight of the reference laser irradiator 301 is suspended from the reference laser holder 305 by the plurality of ropes 306. It is noted that the weight 307 has a hole formed at its center to allow the laser beam 109 to pass therethrough. Further, for reducing the influence of wind blowing into the hoistway 1, a wind protector 308 is included to cover the reference laser irradiator 301. This is because wind may blow into the hoistway 1 prior to elevator installation.

As a result, the influence of wind blowing into the hoistway 1 can be minimized to enable the laser beam 109 to be emitted from the top of the hoistway 1 toward the lowermost part with accuracy. It is in turn possible to identify more accurately the measurement reference in the hoistway 1 for the mobile measuring device 100 moving up and down in the hoistway 1.

Example 3

Figure 6:
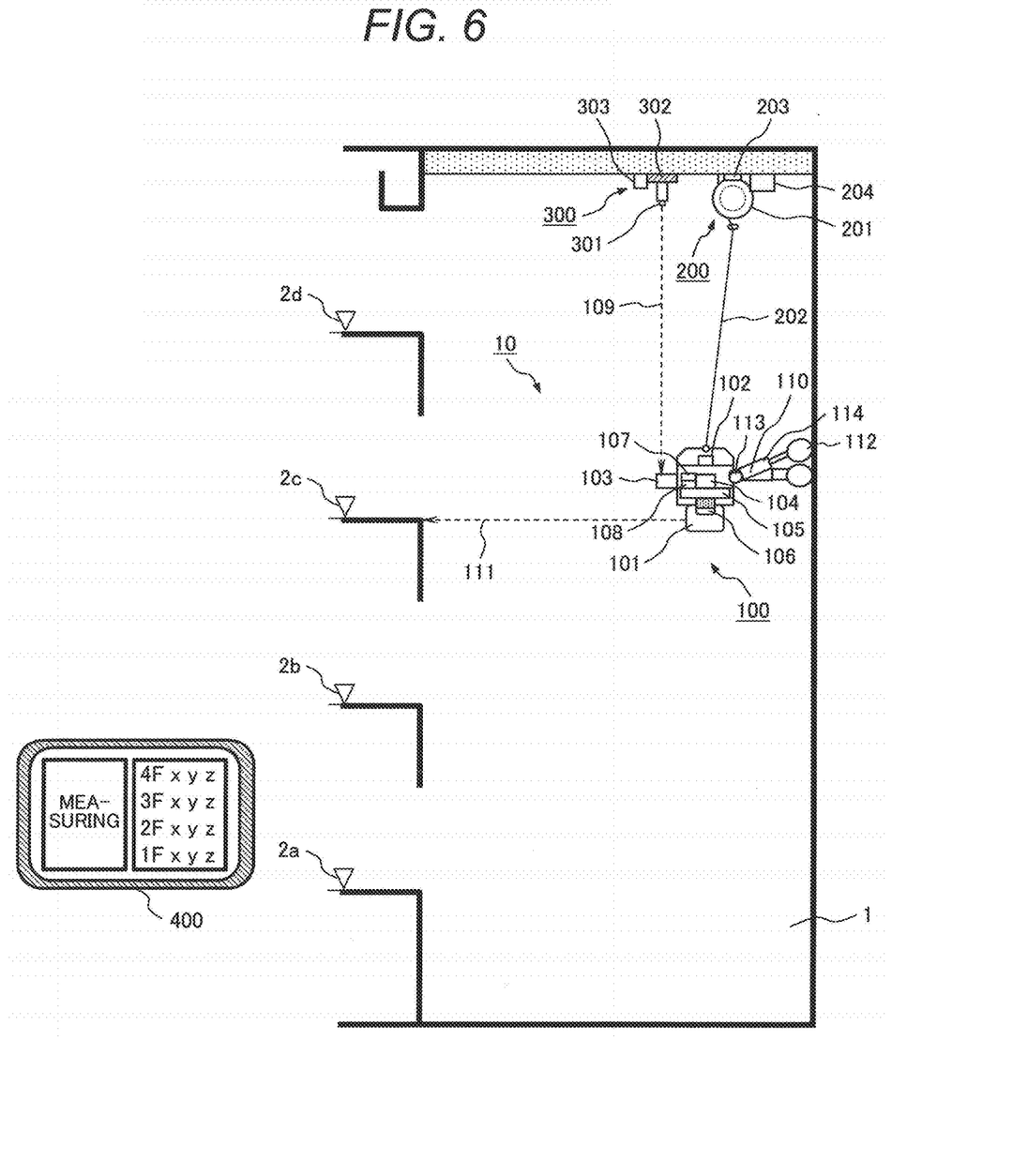
FIG. 6 is an explanatory schematic diagram illustrating an intra-hoistway measurement system according to Example 3.

FIG. 6 is an explanatory schematic diagram illustrating an intra-hoistway measurement system according to Example 3.

The mobile measuring device 100 described in the example is capable of performing a measurement with stability even if the wind blowing into the hoistway 1 is likely to exert influence or even if swinging of the mobile measuring device 100 from front to back and from side to side or twisting of the rope 202 is likely to cause rotation.

Specifically, the mobile measuring device 100 described in FIG. 6 has a contact device 110 to come into contact with a wall in the hoistway 1. The contact device 110 has a contacting portion 112 making contact at two or more points with a wall, and an extendable arm 114, so that a distance between the mobile measuring device 100 and the wall, and the attitude of the mobile measuring device 100 are controlled. Further, the contact device 110 is rotatable relative to a mounting shaft 113 mounted to the mobile measuring device 100. This makes it possible to place the mobile measuring device 100 in an attitude and a position to allow the reference laser detection device 103 to detect the laser beam 109 emitted from the reference laser device 300.

It is noted that the contacting portion 112 is preferably, for example, a rotating body such as a tire.

The mobile measuring device 100 is suspended by the rope 202 in a position (position apart from a wall in the vertical direction) rather than on the vertical line passing through the unrolling point (rolling up point) of the rope 202. Thereby, the gravity center position of the mobile measuring device 100 exists in a position (position apart from a wall in the vertical direction) rather than on the vertical line passing through the unrolling point (rolling up point) of the rope 202. Thereby, the mobile measuring device 100 is stabilized by coming into contact with a wall in the hoistway 1 through the contact device 100 so as to lean against it.

It is noted that, during its up/down movement, the mobile measuring device 100 is not necessarily required to maintain contact with a wall, and only while a measurement is performed, the contact device 110 may be used to bring the mobile measuring device 100 into contact with the wall for stabilization.

It is noted that the example demonstrates an instance where the contact device 110 is brought into contact with a wall in a depth direction corresponding to a portion in which a door or a car door is to be formed, but the position where the contact device 110 is brought into contact with the wall is not limited to this and may be brought into contact with a wall close to the opening (around the entrance) or a side wall in the width direction.

Example 4

Figure 7:
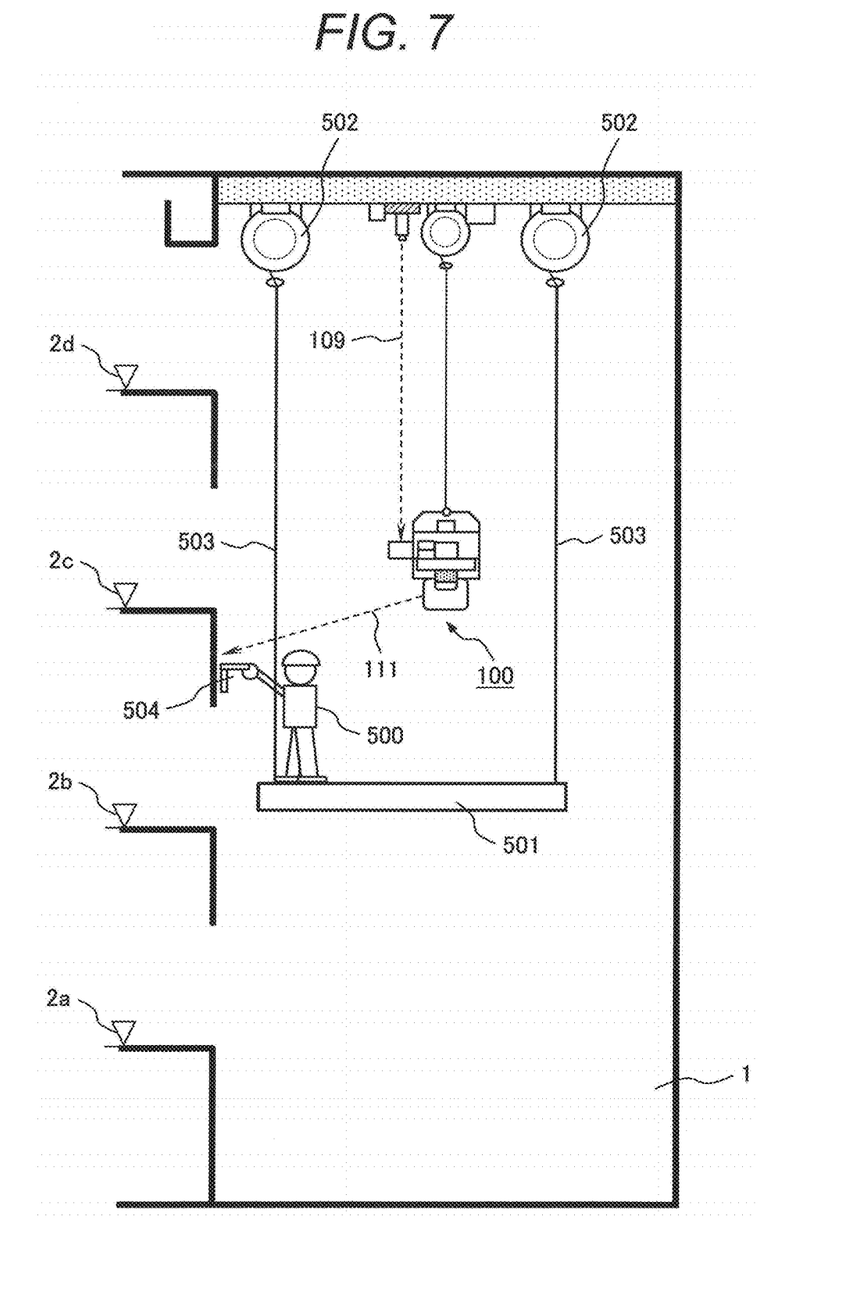
FIG. 7 is an explanatory schematic diagram illustrating a working instruction system according to Example 4.

FIG. 7 is an explanatory schematic diagram illustrating a working instruction system according to Example 4.

In Example 1, the intra-hoistway measurement system 10 is used to measure dimensions within the hoistway 1. The example illustrates that the intra-hoistway measurement system 10 may be used as a working instruction system when a worker 500 places structures (components) of an elevator in the hoistway 1.

As illustrated in FIG. 7, the worker 500 working in the hoistway 1 is on a work platform 501 which is suspended by a plurality of ropes 503 of lifting apparatuses 502 so that the worker 500 mounts structures (components) of the elevator. It is noted that the arrow with the broken line shown in FIG. 7 represents a trajectory of the laser beam 111 emitted by the plane measuring device 101 of the mobile measuring device 100.

It is noted that the laser beam 111 emitted from the plane measuring device 101 of the mobile measuring device 100 may be refracted using, for example, a mirror, a prism, and/or the like, or alternatively, a servomotor and/or the like may be used to incline the plane measuring device 101 so that the laser beam 111 is emitted diagonally.

FIG. 7 illustrates an instance where the worker 500 mounts a bracket 504 as a structure (component) of the elevator onto the wall. The plane measuring device 101 of the mobile measuring device 100 is used to project the laser beam 111 to a position of mounting the bracket 504 with a dot or line (laser marking). The worker 500 mounts the bracket 504 using the dot or line as a guide thus projected by the laser beam 111.

In the example, the bracket 504 is mounted through the projection of the laser beam 111. However, the mobile measuring device 100 may be equipped with a projector and/or the like to project an image (image diagram) serving as an aid to the mounting position.

Stated another way, the mobile measuring device 100 described in the example has a device to project a mounting position for a structure (component) of an elevator onto a wall in the hoistway 1. Thus, the intra-hoistway measurement system 10 can be used as the working instruction system when the worker 500 mounts the structures (components) of the elevator in the hoistway 1.

It should be understood that the present invention is not limited to the above examples and is intended to embrace various modifications. For example, the above examples have been described in detail for the purpose of explaining the present invention clearly, and the present invention is not necessarily limited to including all the components and configurations described above. Further, a portion of the configuration in one example may be substituted for configuration in another example, and/or configuration in one example may be added to configuration in another example.

REFERENCE SIGNS LIST

1 . . . hoistway
2a . . . first floor
2b . . . second floor
2c . . . third floor
2d . . . fourth floor
10 . . . intra-hoistway measurement system
100 . . . mobile measuring device
101 . . . plane measuring device
102 . . . attitude detection device
103 . . . reference laser detection device
104 . . . arithmetic device
105 . . . mobile measuring device power source
106 . . . camera
107 . . . first communication device
108 . . . second communication device
109 . . . laser beam
110 . . . contact device
111 . . . laser beam
112 . . . contacting portion
113 . . . mounting shaft
114 . . . arm
200 . . . hoisting device
201 . . . hoist
202 . . . rope
203 . . . communication device
204 . . . hoisting device power source
300 . . . reference laser device
301 . . . reference laser irradiator
302 . . . reference laser mount
303 . . . reference laser device power source
304 . . . rope
305 . . . reference laser holder
306 . . . rope
307 . . . weight
308 . . . wind protector
400 . . . portable control terminal
500 . . . worker
501 . . . work platform
502 . . . lifting apparatus
503 . . . rope
504 . . . bracket

The invention claimed is:

1. An intra-hoistway measurement system measuring dimensions within a hoistway for an elevator, comprising:
a reference laser device that is mounted to a structure on a ceiling or in an upper portion of the hoistway and emits a laser beam toward a lowermost part;
a mobile measuring device that has a plane measuring device to measure dimensions in a horizontal direction within the hoistway; and
a moving device that is mounted to the structure on the ceiling or in the upper portion of the hoistway and moves the mobile measuring device up and down,
wherein the mobile measuring device comprises:
a reference laser detection device that detects the laser beam emitted from the reference laser device; and
an attitude detection device that detects its own attitude, and
wherein the reference laser device comprises:
a reference laser holder that is suspended from the structure on the ceiling or in the upper portion of the hoistway by a rope;
a reference laser irradiator that is mounted to the reference laser holder; and
a weight that is suspended from the reference laser holder by a plurality of ropes, and has an opening formed in a central portion.

2. The intra-hoistway measurement system according to claim 1, wherein dimensions within the hoistway are calculated based on measurement data obtained from the plane measuring device, the reference laser detection device and the attitude detection device.

3. The intra-hoistway measurement system according to claim 1,
wherein the moving device has
a hoist that is mounted to the structure on the ceiling or in the upper portion of the hoistway, and
a rope that is connected to the hoist and suspends the mobile measuring device, and
the hoist moves the mobile measuring device up/down by rolling up or unrolling the rope.

4. The intra-hoistway measurement system according to claim 1,
wherein the plane measuring device emits a laser beam to measure a distance within the hoistway in a horizontal direction, and scans an optical axis of the laser beam in the horizontal direction.

5. The intra-hoistway measurement system according to claim 1,
wherein the mobile measuring device has a contact device that comes into contact with a wall in the hoistway, and
the mobile measuring device suspended by the rope has a gravity center position existing in a position rather than on a vertical line passing through an unrolling point of the rope of the moving device mounted in the hoistway.

6. The intra-hoistway measurement system according to claim 5,
wherein the contact device has
an extendable arm, and
a contacting portion making contact at two or more points with a wall in the hoistway.

7. The intra-hoistway measurement system according to claim 1,
wherein the mobile measuring device projects a mounting position for a component onto a wall in the hoistway.

* * * * *